(12) United States Patent
Tonogai et al.

(10) Patent No.: US 12,472,635 B2
(45) Date of Patent: Nov. 18, 2025

(54) CONTROL DEVICE, ROBOT, CONTROL METHOD, AND PROGRAM

(71) Applicant: OMRON Corporation, Kyoto (JP)

(72) Inventors: Norikazu Tonogai, Kyoto (JP); Shinya Matsumoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 307 days.

(21) Appl. No.: 18/247,017

(22) PCT Filed: Sep. 3, 2021

(86) PCT No.: PCT/JP2021/032522
§ 371 (c)(1),
(2) Date: Mar. 28, 2023

(87) PCT Pub. No.: WO2022/080036
PCT Pub. Date: Apr. 21, 2022

(65) Prior Publication Data
US 2023/0356406 A1   Nov. 9, 2023

(30) Foreign Application Priority Data

Oct. 16, 2020   (JP) .................................. 2020-174750

(51) Int. Cl.
*B25J 9/16*   (2006.01)
*G06T 7/62*   (2017.01)
*G06T 7/80*   (2017.01)

(52) U.S. Cl.
CPC ............ *B25J 9/1697* (2013.01); *B25J 9/1664* (2013.01); *G06T 7/62* (2017.01); *G06T 7/80* (2017.01); *G06T 2207/30164* (2013.01)

(58) Field of Classification Search
CPC ......... B25J 9/1697; B25J 9/1664; G06T 7/62; G06T 7/80; G06T 2207/30164
See application file for complete search history.

(56) References Cited

U.S. PATENT DOCUMENTS

2004/0122552 A1   6/2004   Ban et al.
2008/0310705 A1*  12/2008  Asatani ................ B62D 57/032
                                                            901/1
(Continued)

FOREIGN PATENT DOCUMENTS

CN   110568450 A   12/2019
JP   2004188562 A   7/2004
(Continued)

OTHER PUBLICATIONS

Nankai Chen and Yaonan Wang, "Design and Collaborative Operation of Multimobile Inspection Robots in Smart Microgrids", 2021, Wiley Complexity.*
Extended European search report issued in European Appln. No. 21879778.5 mailed on Aug. 30, 2024.
International Search Report issued in Intl. Appln. No. PCT/JP2021/032522 mailed Nov. 22, 2021. English translation provided.
(Continued)

*Primary Examiner* — Abby Lin
(74) *Attorney, Agent, or Firm* — ROSSI, KIMMS & McDOWELL LLP

(57) ABSTRACT

A control apparatus for a robot including a three-dimensional sensor to measure a scan area includes a position determiner that determines, based on positions of a plurality of ranges in the scan area, a plurality of measurement positions at each of which the three-dimensional sensor performs measurement of a corresponding range of the plurality of ranges, an operation controller that controls the robot to move and cause the three-dimensional sensor to move to each of the plurality of measurement positions, and an area definer that defines an area including an object in the scan area based on a result of measurement performed by the three-dimensional sensor at each of the plurality of measurement positions.

16 Claims, 6 Drawing Sheets

(56) References Cited

U.S. PATENT DOCUMENTS

| | | | |
|---|---|---|---|
| 2010/0092069 A1* | 4/2010 | Asada | G01N 21/8851 382/141 |
| 2015/0261899 A1* | 9/2015 | Atohira | B25J 9/1671 703/7 |
| 2016/0086343 A1* | 3/2016 | Namiki | G06V 10/60 348/135 |
| 2017/0251143 A1* | 8/2017 | Peruch | H04N 13/243 |
| 2018/0157230 A1 | 6/2018 | Matsushima | |
| 2019/0308324 A1* | 10/2019 | Hattori | G06T 7/73 |
| 2019/0379836 A1 | 12/2019 | Mori et al. | |
| 2020/0246979 A1* | 8/2020 | Wada | G06T 19/00 |
| 2021/0039257 A1* | 2/2021 | Tonogai | B25J 9/1697 |

FOREIGN PATENT DOCUMENTS

| | | |
|---|---|---|
| JP | 2016099257 A | 5/2016 |
| JP | 2018089728 A | 6/2018 |
| JP | 2019155535 A | 9/2019 |

OTHER PUBLICATIONS

Written Opinion issued in Intl. Appln. No. PCT/JP2021/032522 mailed Nov. 22, 2021. English translation provided.

Office Action issued in Chinese Appln. No. 202180067012.4 mailed Aug. 1, 2025.

* cited by examiner

CONTROL DEVICE, ROBOT, CONTROL METHOD, AND PROGRAM

TECHNICAL FIELD

The present invention relates to a control apparatus, a robot, a control method, and a program.

BACKGROUND

At manufacturing or other sites, known robots or other machines move within preset movable ranges for safe operation.

Patent Literature 1 describes a robot control apparatus that sets the movable range of a robot to avoid contact with an object such as peripheral equipment. The robot control apparatus in Patent Literature 1 defines an area including an object (contact area) by obtaining depth data at each point on the surface of the object using a depth sensor (a three-dimensional or 3D sensor) on the robot.

PRIOR ART DOCUMENTS

Patent Document

Patent Literature 1: Japanese Unexamined Patent Application Publication No. 2018-089728

SUMMARY OF THE INVENTION

Problems to be Solved by the Invention

The apparatus in Patent Literature 1 obtains depth data with the depth sensor moving while the posture of the robot is being changed. Patent Literature 1 does not describe determining the position of the depth sensor. With this apparatus, a user determines the position of the depth sensor by, for example, referring to the obtained depth data. This places a burden on the user to define an area including an object (contact area).

One or more aspects of the present invention are directed to a technique for defining, with a less burden on a user, an area including an object to avoid contact of a robot or other machines with the object.

Means for Solving the Problem

The apparatus, the robot, the method, and the program according to one or more aspects of the present invention have the structure below.

A control apparatus according to one aspect of the present invention is a control apparatus for a robot including a three-dimensional sensor to measure a scan area. The control apparatus includes a position determiner that determines, based on positions of a plurality of ranges in the scan area, a plurality of measurement positions at each of which the three-dimensional sensor performs measurement of a corresponding range of the plurality of ranges, an operation controller that controls the robot to move and cause the three-dimensional sensor to move to each of the plurality of measurement positions, and an area definer that defines an area including an object in the scan area based on a result of measurement performed by the three-dimensional sensor at each of the plurality of measurement positions.

This structure eliminates a user input (setting) to determine the measurement positions of the three-dimensional sensor for measuring the scan area. This places a less burden on the user to define an area including an object in the scan area. Each measurement position herein refers to the three-dimensional coordinates and the orientation (optical axis direction) of the three-dimensional sensor.

In the above control apparatus, the plurality of ranges in the scan area may result from dividing the scan area. Each of the plurality of ranges in the scan area may be in a shape of a rectangular prism, a sphere, a cylinder, or a polygon. The plurality of ranges in the scan area may result from slicing the scan area along a predetermined axis into a plurality of planes and dividing a plane of the plurality of planes into a grid.

In the above control apparatus, the position determiner may determine the plurality of measurement positions of the three-dimensional sensor to cause a predetermined position in each of the plurality of ranges in the scan area to be within a field of view of the three-dimensional sensor at a corresponding measurement position of the plurality of measurement positions. This allows reliable measurement of each range in the scan area. Based on the results of precise measurement of each range, an area including an object can be defined more accurately.

In the above control apparatus, the position determiner may determine the plurality of measurement positions of the three-dimensional sensor on a sphere or a circumference having a predetermined radius and centered on the predetermined position in each of the plurality of ranges in the scan area. With this structure, each range in the scan area undergoes multiple measurement processes performed at the same distance from the range but at different positions. Based on the results of the measurement processes, an area including an object can be defined more accurately.

In the above control apparatus, the scan area may be in a shape of a rectangular prism. The position determiner may determine, as each of the plurality of measurement positions of the three-dimensional sensor, a position at which an optical axis of the three-dimensional sensor is orthogonal to a plane of the scan area and the three-dimensional sensor is at a predetermined distance from a predetermined position in a corresponding range of the plurality of ranges in the scan area. With this structure, each range in the scan area undergoes a single measurement process. Thus, an area including an object can be defined faster. For example, this process is effective for an object that is expected to be planar.

In the above control apparatus, the predetermined position may be a center of gravity. The center of gravity is a representative position representing the characteristic of each range in the scan area. Thus, the center of gravity can be used as, for example, a reference to allow more accurate measurement of each range.

The above control apparatus may further include a path determiner that determines a path for the robot to move along to cause the three-dimensional sensor to move between the plurality of measurement positions.

In the above control apparatus, the path determiner may determine the path to cause the three-dimensional sensor to move to a measurement position in a shortest time or with least displacement from a first measurement position of the plurality of measurement positions. The measurement position may be other than a measurement position to which the three-dimensional sensor moves before moving to the first measurement position. This allows rapid movement between two measurement positions, thus allowing faster measurement of the scan area.

In the above control apparatus, the position determiner may change a measurement position of the plurality of measurement positions corresponding to a posture of the robot undeterminable by inverse kinematics to a position corresponding to a posture of the robot determinable by the inverse kinematics. This eliminates unintended processes to move the robot to an unreachable position, thus allowing more efficient measurement of the scan area.

In the above control apparatus, the position determiner may exclude, from the plurality of measurement positions, one of two measurement positions of the plurality of measurement positions at which the three-dimensional sensor has fields of view overlapping each other by at least a predetermined degree. This reduces the likelihood of redundant measurement results being obtained, thus allowing more efficient measurement of the scan area.

The above control apparatus may further include a sensor controller that controls an operation of the three-dimensional sensor.

In the above control apparatus, the sensor controller may control the three-dimensional sensor to measure the scan area while the three-dimensional sensor is moving between the plurality of measurement positions. Thus, the scan area can be measured at many positions, thus allowing more accurate measurement.

In the above control apparatus, the three-dimensional sensor may include an imager that captures a two-dimensional image to measure the scan area using the two-dimensional image. The sensor controller may change, in response to the two-dimensional image captured by the three-dimensional sensor at a measurement position of the plurality of measurement positions including at least a predetermined number of pixels with a luminance value outside a predetermined range, at least one of a value of illuminance of an illuminator included in the three-dimensional sensor, a value of exposure time of the imager, or a value of gain of the imager from a value at which the two-dimensional image is captured. The sensor controller may control the three-dimensional sensor to perform measurement at the measurement position. This increases the accuracy of three-dimensional measurement with less black clipping and halation, thus allowing more accurate measurement of the scan area.

In the above control apparatus, the three-dimensional sensor may include an imager that captures a two-dimensional image to measure the scan area using the two-dimensional image. The position determiner may change a measurement position of the plurality of measurement positions in response to the two-dimensional image captured by the three-dimensional sensor at the measurement position including at least a predetermined number of pixels with a luminance value outside a predetermined range. The captured two-dimensional image has less black clipping and halation, thus allowing more accurate measurement of the scan area.

A robot may include the above control apparatus and a three-dimensional sensor that measures a scan area.

One or more aspects of the present invention may be directed to an apparatus including at least one of the above elements, or to an electronic device, a control system, a scan system, or a scan device. One or more aspects of the present invention may also be directed to a control method for a robot including at least one of the above processes, or to an area defining method or a scan method. One or more aspects of the present invention may be directed to a program for implementing any of these methods or to a non-transitory storage medium storing the program. The above elements and processes may be combined with one another in any manner to form one or more aspects of the present invention.

Effect of the Invention

The apparatus, the robot, the method, and the program according to the above aspects of the present invention define, with a less burden on a user, an area including an object to avoid contact of a robot or other machines with the object.

MODE FOR CARRYING OUT THE INVENTION

Figure 1:
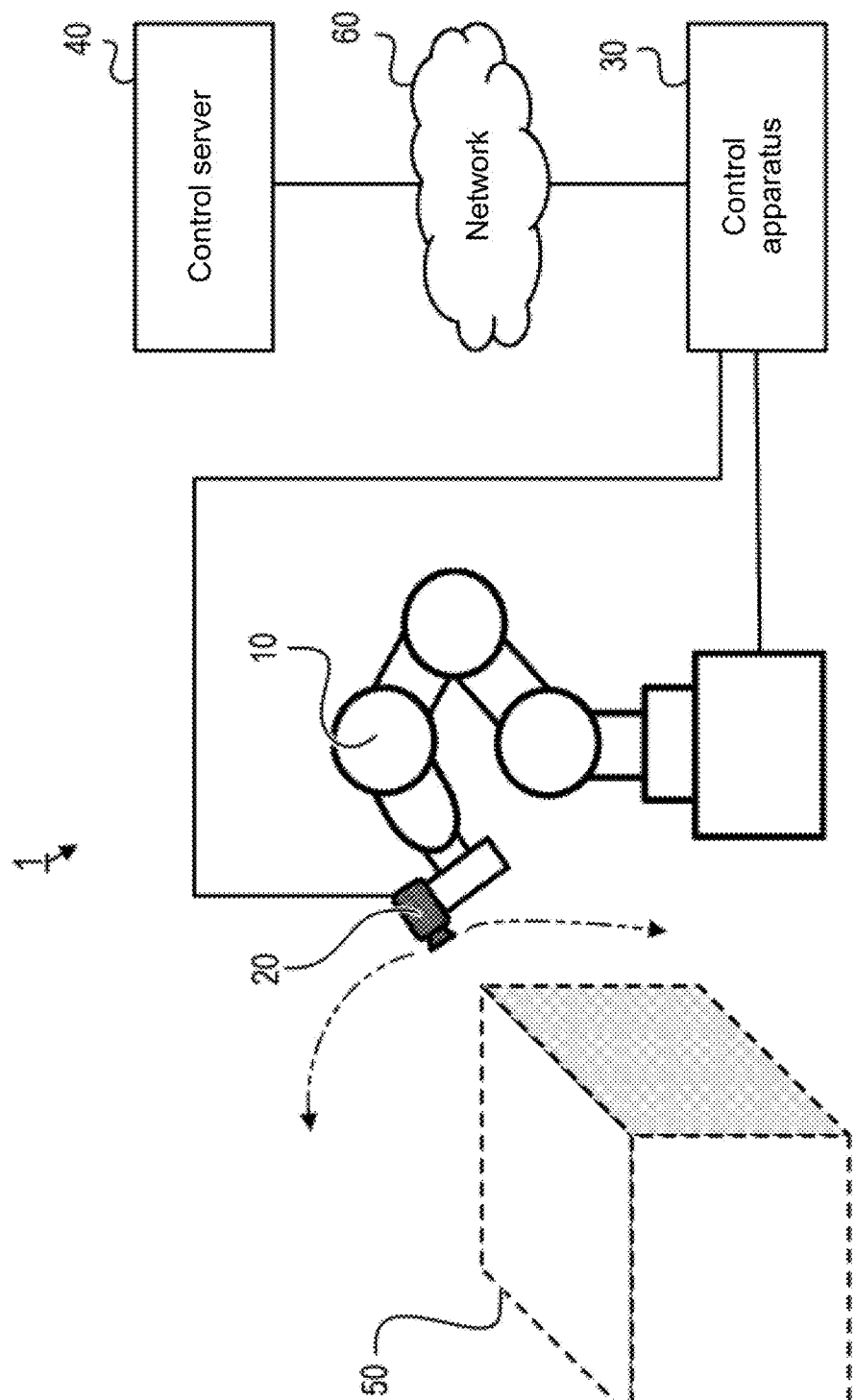
FIG. 1 is a diagram of a scan system according to a first embodiment.

Embodiments of the present invention will now be described with reference to the drawings.

Application Example

A scan system 1 including a control apparatus 30 will now be described. The scan system 1 measures (scans) a scan area 50 with a three-dimensional (3D) sensor at multiple measurement positions (viewpoints) to define an area including an object (contact area) in the scan area 50. After the contact area is defined, for example, a robot 10 can avoid the contact area and move in the scan area 50 without coming in contact with the object. A machine other than the robot 10 can also move in the scan area 50 without coming in contact with the object. The scan system 1 determines multiple measurement positions based on the positions of subareas resulting from dividing the scan area 50. This places a less burden on the user manually setting multiple measurement positions. Each measurement position herein refers to the 3D coordinates and the orientation (optical axis direction) of the 3D sensor 20.

First Embodiment

[Structure of Scan System]

The scan system 1 according to the first embodiment will now be described with reference to the system diagram of FIG. 1. The scan system 1 includes the robot 10, the 3D sensor 20, the control apparatus 30, and a control server 40.

The robot 10 changes the posture to move the 3D sensor 20. The robot may be any robot such as a vertically articulated robot, a mover robot, a parallel link robot, or a linear robot. In the present embodiment, the robot 10 is an articulated robot that includes an arm with multiple joints and controls the angle of each joint to control the position (orientation) of the 3D sensor 20. Each joint includes a drive shaft drivable by a motor to rotate the arm.

The 3D sensor 20 measures (scans) the scan area 50 and obtains 3D information (point cloud data) about the scan area 50. The 3D sensor 20 is located at the end of the arm in the robot 10. In other words, the 3D sensor 20 is included in the robot 10. The 3D sensor 20 is, for example, a depth sensor that obtains depth information or a range image sensor that obtains range images. The 3D sensor 20 repeatedly measures (scans) the scan area 50 at different measurement positions to define the contact area in the scan area 50. The 3D sensor 20 may include a camera (imager) to capture (obtain) two-dimensional (2D) images, in addition to obtaining 3D information. The 3D sensor 20 may also include an illuminator for illuminating the scan area 50 with light or a projector for projecting an image to the scan area 50.

The 3D sensor 20 may use either an active method or a passive method to calculate the distance from the 3D sensor 20 to an object in the scan area 50. The active method is to calculate the distance by projecting light from the 3D sensor 20 onto an object and receiving reflected light from the object. The passive method is to calculate the distance by receiving light from an object illuminated with natural or other light. The active method may include, for example, projecting infrared light to an object with a projector, receiving infrared light reflected from the object with a camera, and calculating the distance to the object based on the principle of triangulation (a method using spotlight, or a time-of-flight or TOF method). The active method may include, for example, projecting a pattern image onto an object with a projector, capturing the pattern image on the object with a camera, and calculating the distance to the object based on distortion of the captured pattern image. The passive method may include capturing two images of an object at two different positions and calculating the distance based on the difference between the two images.

The control apparatus 30 controls the robot 10 and the 3D sensor 20. The control apparatus 30 controls the posture (the movement or the arm joint angles) of the robot 10 to control the measurement position (the orientation or viewpoint) of the 3D sensor 20. The control apparatus 30 also controls the time for measurement performed by the 3D sensor 20. Further, the control apparatus 30 defines the contact area based on the results of measurement performed by the 3D sensor 20.

The control server 40 controls multiple control apparatuses 30 with a network 60. The control server 40 may include some or all of the components included in each control apparatus 30.

[Structure of Control Apparatus]

Figure 2:
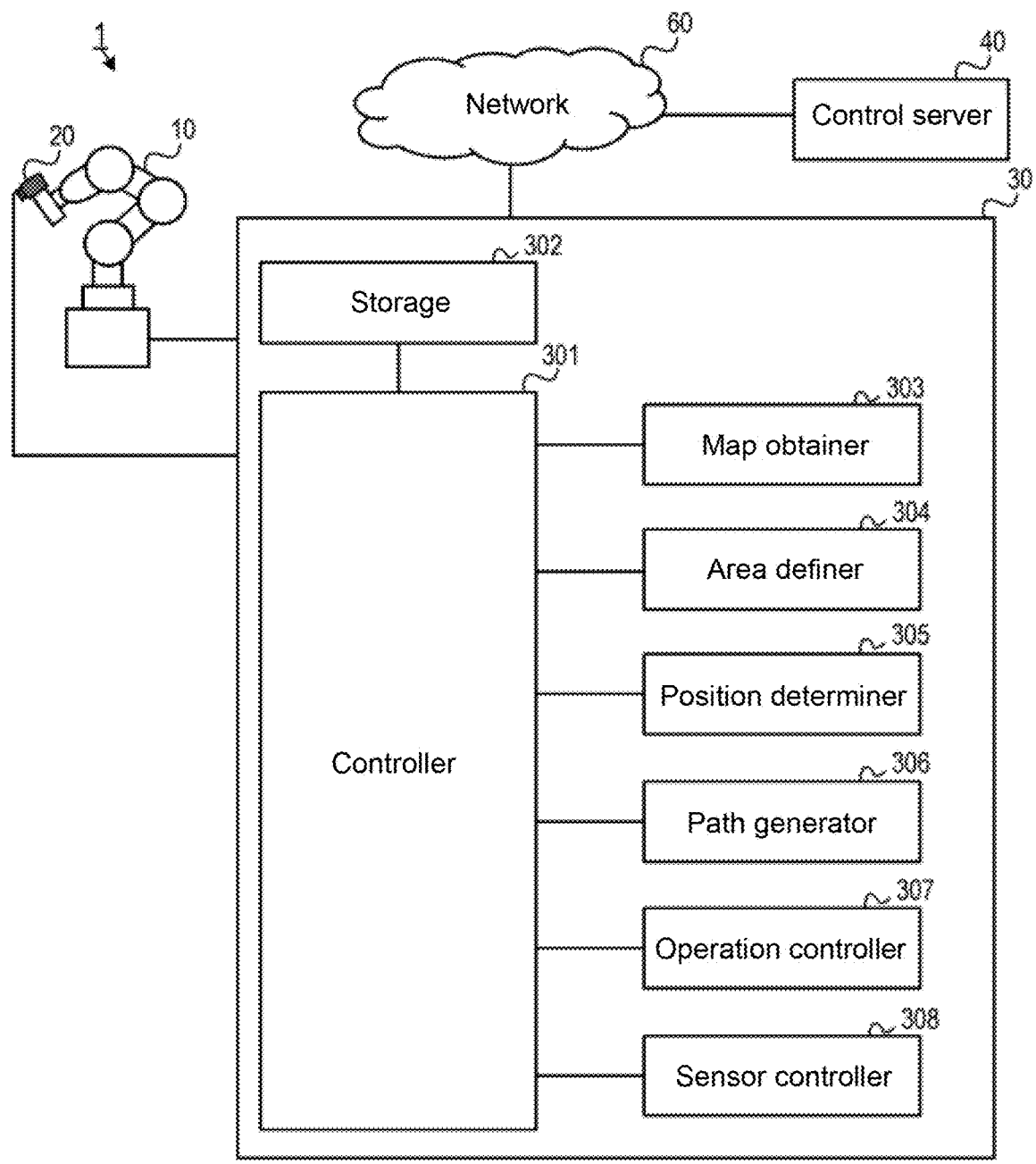
FIG. 2 is a block diagram of a control apparatus according to the first embodiment, showing its internal structure.

The internal structure of the control apparatus 30 will now be described with reference to the block diagram of FIG. 2. The control apparatus 30 includes a controller 301, a storage 302, a map obtainer 303, an area definer 304, a position determiner 305, a path generator 306, an operation controller 307, and a sensor controller 308.

The controller 301 controls the components of the control apparatus 30 in accordance with a program stored in the storage 302. The process performed by the controller 301 may be performed by the control server 40.

The storage 302 stores information for the components to operate. The storage 302 stores information indicating, for example, the position, the size, and the shape of the scan area 50. The storage 302 also stores the specifications of the 3D sensor 20 (e.g., the measurable distance range and the viewing angle) and the specifications of the robot 10 (e.g., the motion ranges of the arm joints and the rotational speeds of the joints). These items of information can be preset by the user for the control apparatus 30.

Further, the storage 302 stores map information indicating the status of measurement (scanning) performed by the 3D sensor 20 at points (voxels) in the scan area 50. The points in the scan area 50 correspond to different subareas (e.g., cubes). For example, each point in the scan area 50 is the center (center of gravity) of the corresponding subarea. The storage 302 stores, for the subarea corresponding to each point in the scan area 50, map information indicating whether the subarea is a determined-subarea determined to include or determined not to include an object or an undetermined-subarea undetermined to include or undetermined not to include an object. The map information indicates whether the determined-subarea is an object subarea determined to include an object or an empty subarea determined not to include an object. In other words, the map information indicates each point in the scan area 50 being any one of a point with an object, a point without an object, or a point undetermined to be with or without an object.

The map obtainer 303 generates or updates the above map information based on the results of measurement or scanning performed by the 3D sensor 20. More specifically, the map obtainer 303 generates (updates) map information based on the results of measurement of the scan area 50 at multiple measurement positions performed by the 3D sensor 20.

For example, the map obtainer 303 performs coordinate transformation based on the measurement positions to transform 3D information (depth data) at each point on the surface of the object defined in the sensor coordinate system (the coordinate system for the 3D sensor 20) into 3D position information defined in the robot coordinate system (the coordinate system for the robot 10). The map obtainer 303 can thus define the position of the object indicated by the depth data in the robot coordinate system. When the 3D sensor 20 measures the scan area 50 at different measurement positions, the map obtainer 303 can obtain different sets of depth data. This increases the reliability of determination as to whether an object is at each point (in each subarea) in the scan area 50. Based on the reliability, the map obtainer 303 determines (defines) the subarea corresponding to each point to be the undetermined-subarea, the object subarea, or the empty subarea.

The area definer 304 defines (determines) the contact area based on the results of measurement (scanning) performed by the 3D sensor 20. More specifically, the area definer 304 defines, based on the map information, the area including object subareas as the contact area.

The position determiner 305 determines multiple measurement positions (movement positions) at which the 3D sensor 20 is placed for measurement. The position determiner 305 may determine multiple candidates for measurement positions and select, from the candidates, measurement positions to which the 3D sensor 20 is movable (to which the robot 10 can move the 3D sensor 20). Each measurement position of the 3D sensor 20 can be identified by, for example, the height or the optical axis direction of the 3D sensor 20. Each measurement position of the 3D sensor 20 can be identified by the posture of the robot 10. The correspondence between the position of the 3D sensor 20 and the posture of the robot 10 is premeasured (predetermined) through calibration.

The path generator 306 (path determiner) generates (determines) a movement path for the robot 10 to move along to cause the 3D sensor 20 to move between the multiple measurement positions determined by the position determiner 305. For example, the path generator 306 determines the movement path along which the 3D sensor 20 moves through all the multiple measurement positions in the shortest time.

The operation controller 307 controls the robot 10 to move the 3D sensor to multiple measurement positions. The operation controller 307 controls the posture of the robot 10 along the movement path determined by the path generator 306 to control the position of the 3D sensor 20.

The sensor controller 308 controls the 3D sensor 20. The sensor controller 308 controls the 3D sensor 20 to perform measurement upon, for example, the robot moving the 3D sensor 20 to each measurement position. The sensor controller 308 can also control the light emission (brightness level) of an illuminator included in the 3D sensor 20.

The control apparatus 30 may be a computer including, for example, a central processing unit (CPU) or a processor, a memory, and a storage. In this case, the components shown in FIG. 2 are implemented by loading a program stored in the storage into the memory and executing the program with the CPU. The computer may be a general-purpose computer such as a personal computer, a server computer, a tablet, or a smartphone or a built-in computer such as an onboard computer. In some embodiments, some or all of the components shown in FIG. 2 may be formed using an application-specific integrated circuit (ASIC) or a field-programmable gate array (FPGA). In some embodiments, some or all of the components shown in FIG. 2 may be implemented by cloud computing or distributed computing.

[Position Determination Process for 3D Sensor]

Figure 3A:
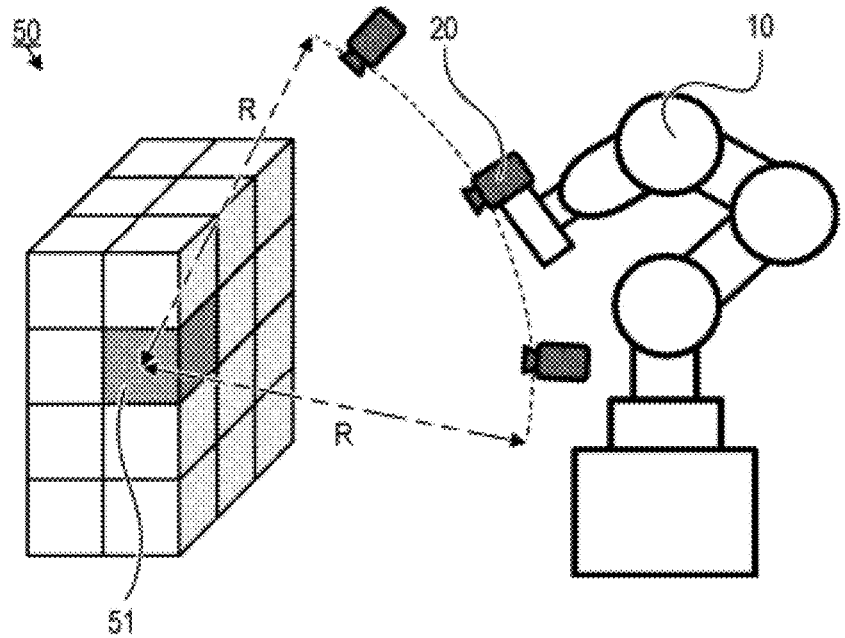
FIGS. 3A and 3B are diagrams each describing determination of the measurement position in the first embodiment.

The process for determining the measurement position of the 3D sensor 20 performed by the position determiner 305 (position determination process) will now be described with reference to the schematic diagram of FIG. 3A. FIGS. 3A to 4B each show the robot 10, the 3D sensor 20, and a part of the scan area 50. In the present embodiment, the 3D sensor 20 measures (scans) each of multiple areas (subareas) resulting from dividing the scan area 50. The position determiner 305 determines multiple measurement positions of the 3D sensor 20 based on the positions of the corresponding subareas. More specifically, the position determiner 305 determines multiple measurement positions to cause each subarea (or a predetermined position in the subarea) to be within the field of view of the 3D sensor 20 at the corresponding one of the multiple measurement positions. For example, the scan area 50 is a cube (rectangular prism) with one meter on each side. The subareas are, for example, $6^3=216$ cubes (rectangular prisms) resulting from dividing the scan area 50. Each subarea is sufficiently larger than the area corresponding to a single point indicated by the map information. The scan area 50 and subareas may have any sizes and shapes. For example, the ranges in the scan area 50 may each have the shape of a rectangular prism, a sphere, a cylinder, or a polygon. The size and shape of each subarea may be prestored in the storage 302 or may be determined by the position determiner 305 based on the size and shape of the scan area 50.

FIG. 3A is a diagram describing the measurement positions of the 3D sensor 20 for measuring a subarea 51 resulting from dividing the scan area 50. In the present embodiment, the position determiner 305 determines, as the multiple measurement positions for measuring the subarea 51, multiple positions on a sphere having a radius R and centered on any point (the center of gravity in the present embodiment) in the subarea 51. The position determiner 305 controls the measurement position of the 3D sensor 20 to cause the optical axis of the 3D sensor to be aligned with the center of gravity of the subarea 51. For the single subarea 51, for example, 100 measurement positions are determined. The position determiner 305 determines multiple measurement positions for measuring the subarea 51 to be, for example, at predetermined intervals. The radius R is within the measurable distance from the 3D sensor 20 (e.g., 30 to 90 cm). For example, the radius R has the middle value (e.g., 60 cm) of the measurable distance. The information about the measurable distance is stored in the storage 302 after being input from the user or from the 3D sensor 20.

In the same manner as for the subarea 51, the position determiner 305 determines multiple measurement positions for each of the multiple subareas resulting from dividing the scan area 50.

Figure 3B:
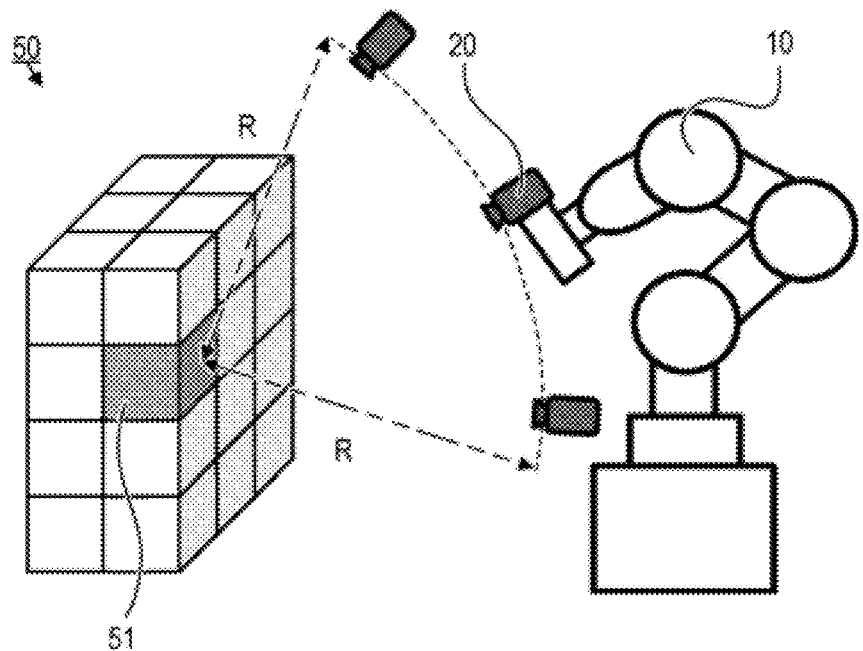
Figure 4A:
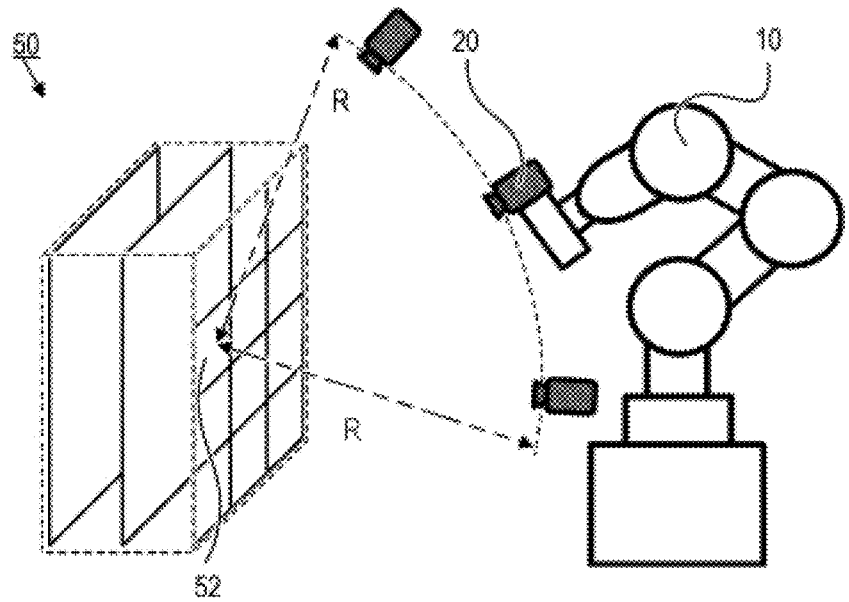
FIGS. 4A and 4B are diagrams each describing determination of the measurement position in the first embodiment.

In some embodiments, the multiple measurement positions for measuring the subarea 51 may not be on a sphere having the radius R and centered on the center of gravity of the subarea 51. As shown in FIG. 3B, for example, the multiple measurement positions for measuring the subarea 51 may be on a sphere having the radius R and centered on the center of gravity of a plane of the subarea 51 (e.g., the plane of the subarea nearest the robot 10). In other words, as shown in FIG. 4A, the position determiner 305 may determine the measurement positions for each of subareas 52 resulting from slicing the scan area 50 along a predetermined axis (in a predetermined axial direction) into multiple planes and dividing one or more of the planes into a grid.

Figure 4B:
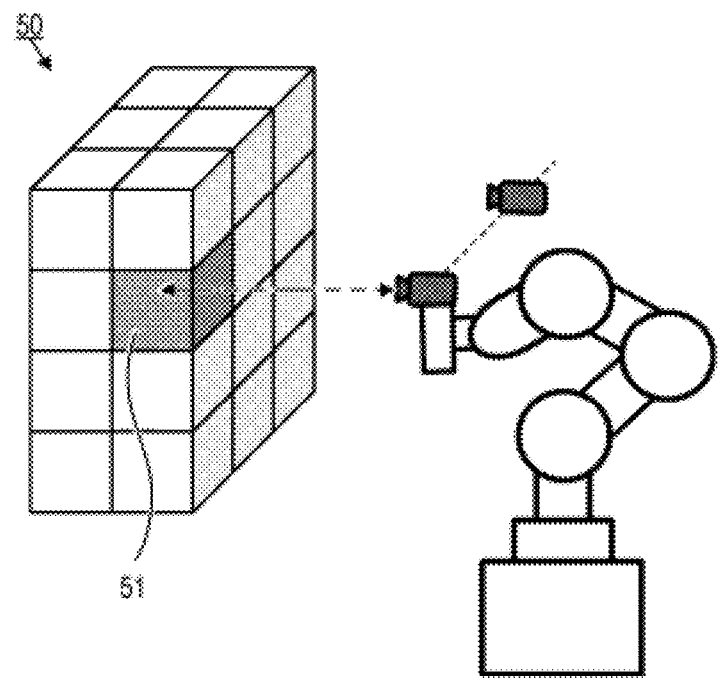

In this manner, the position determiner 305 in the present embodiment determines, as the multiple measurement positions, positions on a sphere having the radius R. The positions may be determined in this manner when each subarea is spherical. In some embodiments, the position determiner 305 may determine, as the multiple measurement positions, positions on a circumference having the radius R and centered on the subarea 51. The circumference may be parallel to a predetermined plane (e.g., any plane of the scan area 50 or the horizontal plane). The position determiner 305 may determine the measurement positions in this manner when each subarea is cylindrical. As shown in FIG. 4B, the position determiner 305 may determine, as the measurement position of the 3D sensor 20, the position at which the optical axis of the 3D sensor 20 is orthogonal to a plane of the scan area 50 and the 3D sensor 20 is at a distance R from the center of gravity of the subarea 51 (or the center of gravity of a plane of the subarea 51). At each position determined in this manner, a single measurement process alone is performed for the corresponding subarea. This allows efficient measurement of the scan area 50 with fewer motions for an object that is expected to be planar.

[Contact Area Defining Process]

Figure 5:
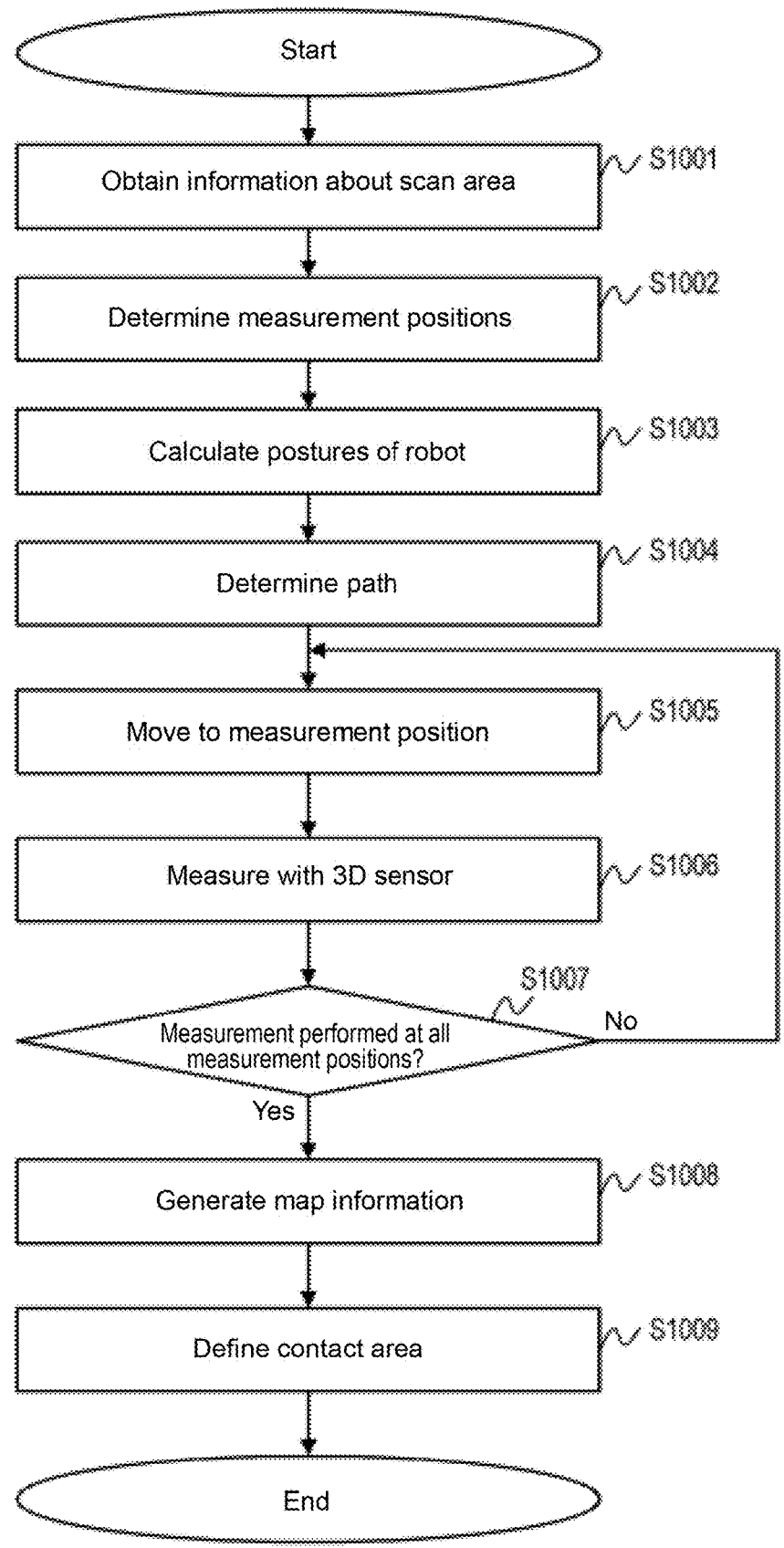
FIG. 5 is a flowchart of a contact area defining process in the first embodiment.

A contact area defining process performed by the control apparatus 30 will now be described with reference to FIG. 5. FIG. 5 is a flowchart of the contact area defining process. The processing in the steps in the flowchart of FIG. 5 is performed by the controller 301 executing a program stored in the storage 302 or by other components controlled by the controller 301.

In step S1001, the controller 301 obtains information indicating the range (size and position) of the scan area 50 from the storage 302. The controller 301 may obtain information indicating the range of the scan area 50 input from the user, rather than from the storage 302.

In step S1002, the position determiner 305 determines multiple measurement positions based on the positions of the corresponding subareas resulting from dividing the scan area 50, as described above. The position determiner 305 may exclude, from the multiple measurement positions, one of two measurement positions at which the 3D sensor 20 has the fields of view (viewing ranges) overlapping each other by at least a predetermined degree. Each field of view extends in the shape of a circular cone with the apex at the 3D sensor 20 and the height along the optical axis. The degree of overlap between the two fields of view is, for example, the degree of overlap between subareas included in the two fields of view. Thus, the 3D sensor 20 can avoid obtaining redundant information and measure the scan area 50 efficiently.

In step S1003, the position determiner 305 determines the postures of the robot 10 with the 3D sensor 20 being placed at the multiple measurement positions. The postures of the robot 10 can be determined (calculated) by geometrically solving the known inverse kinematics (IK) based on the measurement positions of the 3D sensor 20.

The position determiner 305 may delete (exclude), from the multiple measurement positions determined by the position determiner 305, a measurement position corresponding to a posture of the robot 10 undeterminable by inverse kinematics. In some embodiments, the position determiner 305 may change a measurement position corresponding to a posture of the robot 10 undeterminable by inverse kinematics to a position corresponding to a posture of the robot 10 determinable by inverse kinematics within a predetermined distance (e.g., 1 cm) from the measurement position. In this case, the position determiner 305 changes the measurement position without changing the subarea to be aligned with the optical axis of the 3D sensor 20 (in other words, the measurement target subarea).

In step S1004, the path generator 306 generates (determines) a movement path for the robot 10 to move along to cause the 3D sensor 20 to move between the multiple measurement positions determined by the position determiner 305. The movement path includes, for example, information indicating the order in which the 3D sensor 20 moves to the multiple measurement positions. To shorten the movement time, for example, the path generator 306 determines, as the measurement position to be reached first, the position farthest of the multiple measurement positions from the robot 10 (specifically, farthest from the center of the robot 10 or from the arm base). As a second measurement position subsequent to a first measurement position, the path generator 306 determines, for example, the measurement position of the candidate measurement positions that can be reached in the shortest time or with the least displacement (shortest distance) from the first measurement position. The second measurement position determined by the path generator 306 is other than any of the measurement positions to which the 3D sensor 20 moves before moving to the first measurement position. The path generator 306 determines the second measurement position as the measurement position to which the 3D sensor 20 moves subsequently to the first measurement position. The 3D sensor 20 can thus move between the multiple measurement positions in a shorter time. The robot 10 moves the 3D sensor 20 by moving multiple joints of the arm simultaneously. Thus, the distance between two positions may not be proportional to the time taken for movement between the two positions.

In step S1005, the operation controller 307 causes the robot 10 to move along the path generated by the path generator 306 to move the 3D sensor 20 to one of the multiple measurement positions determined by the position determiner 305.

In step S1006, the sensor controller 308 controls the 3D sensor 20 to measure the scan area 50 at the measurement position resulting from the movement. The 3D sensor 20 thus obtains 3D information (point cloud data) about the scan area 50. The 3D sensor 20 outputs the 3D information to the control apparatus 30.

In step S1007, the controller 301 determines whether the 3D sensor 20 has performed measurement at all the multiple measurement positions determined by the position determiner 305. When the 3D sensor 20 has performed measurement at all the multiple measurement positions, the processing advances to step S1008. When the 3D sensor 20 has yet to perform measurement at any of the multiple measurement positions, the processing advances to step S1005. In some embodiments, the controller 301 may determine, for example, whether the 3D sensor 20 has performed measurement at a predetermined number of measurement positions or more for each subarea, rather than at all the multiple measurement positions.

In step S1008, the map obtainer 303 generates map information based on the information about the multiple measurement positions and based on the 3D information (point cloud data) resulting from the 3D sensor 20 measuring the scan area 50 at the multiple measurement positions. When the generated map information indicates any range (area) being an undetermined-subarea, the controller 301 may repeat the processing in steps S1002 to S1008 until the undetermined-subarea changes to the determined-subarea.

In step S1009, the area definer 304 defines, based on the map information, the contact area including an object. More specifically, the area definer 304 defines, based on the map information, an area including any object subarea as the contact area.

The sensor controller 308 may cause the 3D sensor 20 to perform measurement while the 3D sensor 20 is moving between multiple measurement positions (while the 3D sensor 20 is moving in step S1005), in addition to measurement at the multiple measurement positions. For example, the sensor controller 308 may cause the 3D sensor 20 to perform measurement at intervals of a predetermined time (e.g., 0.5 seconds) while the 3D sensor 20 is moving between two measurement positions determined by the position determiner 305. In some embodiments, the sensor controller 308 may cause the 3D sensor 20 to perform measurement every time the 3D sensor 20 moves by a predetermined distance (e.g., 1 cm) while moving between two measurement positions determined by the position determiner 305. The 3D sensor 20 can thus obtain more 3D information that can be used by the area definer 304 to define the contact area accurately.

Thus, the control apparatus 30 according to the present embodiment determines multiple measurement positions of the 3D sensor 20 based on the positions of the corresponding subareas in the scan area 50 to measure these subareas. In other words, the control apparatus 30 can determine multiple measurement positions without the user inputting the measurement positions. This reduces the workload on the user to define the contact area.

[First Modification]

As described above, the 3D sensor 20 may capture 2D images using a camera included in the 3D sensor 20 to obtain 3D information about the scan area 50. In this case, 2D images of the scan area 50 with any halation or black clipping are likely to cause noise in the results of measurement of the scan area 50 performed by the 3D sensor 20. In the present modification, the scan system 1 controls the position or state of the 3D sensor 20 to reduce the likelihood of halation or black clipping in 2D images. In the present modification, the 3D sensor 20 includes a camera (imager) for capturing 2D images.

Figure 6:
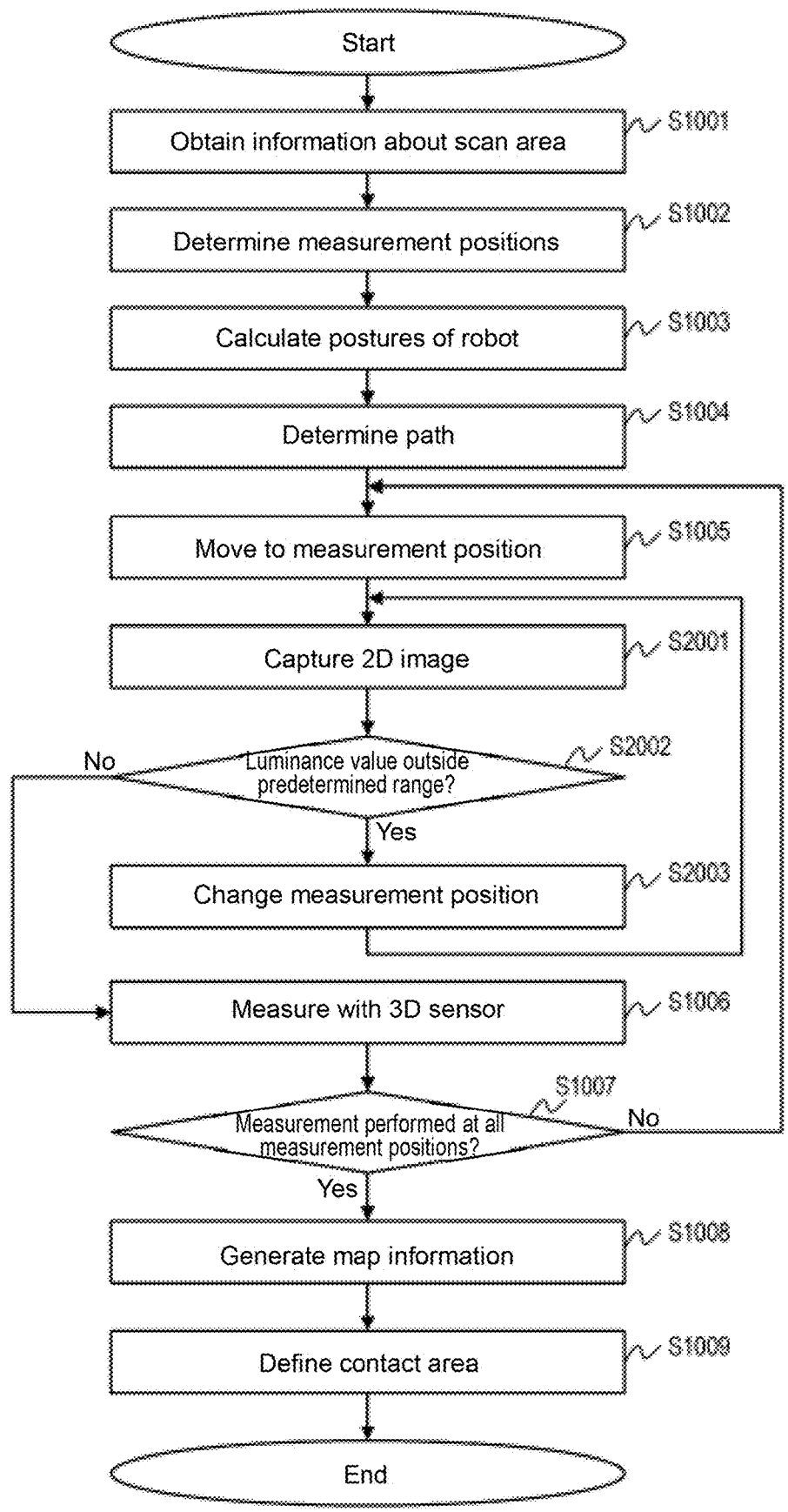
FIG. 6 is a flowchart of a contact area defining process in a first modification.

A contact area defining process performed by the control apparatus 30 according to the present modification will now be described with reference to FIG. 6. FIG. 6 is a flowchart of the contact area defining process. The processing in the steps in the flowchart of FIG. 6 is performed by the controller 301 executing a program stored in the storage 302 or by other components controlled by the controller 301. Steps similar to those in the first embodiment are given the same numbers and are not described in detail.

In step S2001, the sensor controller 308 controls the 3D sensor 20 to capture (obtain) a 2D image of the scan area 50 at the measurement position resulting from movement.

In step S2002, the sensor controller 308 determines whether the captured 2D image has a luminance value outside a predetermined range (e.g., a luminance value of 10 or less or 240 or greater when the luminance value ranges from 0 to 255). More specifically, for example, the sensor controller 308 determines whether at least a predetermined number of pixels have a luminance value of 10 or less or 240 or greater when the luminance value ranges from 0 to 255. When the 2D image has a luminance value outside the predetermined range, the processing advances to step S2003. When the 2D image has a luminance value within the predetermined range, the processing advances to step S1006. The predetermined range of the luminance value may be set to any range that allows detection of black clipping or halation.

In step S2002, the sensor controller 308 performs determination for both halation and black clipping. However, the sensor controller 308 may perform determination for one of halation or black clipping. In other words, the sensor controller 308 may determine whether at least a predetermined number of pixels have a luminance value of 10 or less or may determine whether at least a predetermined number of pixels have a luminance value of 240 or greater.

Upon detecting halation or black clipping in the 2D image, the position determiner 305 changes, in step S2003, the corresponding measurement position within a predetermined distance from the measurement position. In this case, the position determiner 305 changes the measurement position without changing the subarea to be aligned with the optical axis of the 3D sensor 20 (in other words, the measurement target subarea). The operation controller 307 then moves the 3D sensor 20 to the measurement position resulting from the change. In step S2003, the sensor controller 308 may control the 3D sensor 20 in combination with or independently of the movement of the 3D sensor 20 described above. More specifically, the sensor controller 308 may change at least one of the value of illuminance of the illuminator in the 3D sensor 20, the value of the camera exposure time, or the value of the camera gain from the value in the most recent step S2001. The sensor controller 308 may also change the illumination time of the illuminator in the 3D sensor 20. Upon completion of the processing in step S2003, the processing advances to step S2001 to capture a 2D image again.

The 3D sensor 20 controlled in this manner can measure the scan area 50 in a more appropriate environment, thus allowing more accurate measurement and defining the contact area more accurately.

The scope of the claims is construed without being limited to the features described in the embodiments described above. The scope of the claims is construed to include the scope understandable by those skilled in the art to solve intended issues in view of the common technical knowledge at the time of filing.

(Appendix 1)

A control apparatus (30) for a robot (10) including a three-dimensional sensor (20) to measure a scan area, the control apparatus (30) comprising:

a position determiner (305) configured to determine, based on positions of a plurality of ranges in the scan area (50), a plurality of measurement positions at each of which the three-dimensional sensor (20) performs measurement of a corresponding range of the plurality of ranges;

an operation controller (307) configured to control the robot (10) to move and cause the three-dimensional sensor (20) to move to each of the plurality of measurement positions; and an area definer (304) configured to define an area including an object in the scan area (50) based on a result of measurement performed by the three-dimensional sensor (20) at each of the plurality of measurement positions.

(Appendix 2)

A control method for a robot (10) including a three-dimensional sensor (20) to measure a scan area, the control method comprising:

(S1002) determining, based on positions of a plurality of ranges in the scan area (50), a plurality of measurement positions at each of which the three-dimensional sensor (20) performs measurement of a corresponding range of the plurality of ranges;

(S1005) controlling the robot (10) to move and cause the three-dimensional sensor (20) to move to each of the plurality of measurement positions; and (S1009) defining an area including an object in the scan area (50) based on a result of measurement performed by the three-dimensional sensor (20) at each of the plurality of measurement positions.

DESCRIPTION OF SYMBOLS

1 scan system
10 robot
20 3D sensor
30 control apparatus
40 control server
50 scan area
60 network
301 controller
302 storage
303 map obtainer
304 area definer
305 position determiner
306 path generator
307 operation controller
308 sensor controller

The invention claimed is:

1. A control apparatus for a robot including a three-dimensional sensor to measure a scan area, the control apparatus comprising:

a processor; and a memory storing instructions that, when executed by the processor, cause the processor to function as:

a position determiner configured to divide the scan area into a plurality of subareas, to set a plurality of candidate measurement positions for each subarea of the plurality of subareas based on positions of the plurality of subareas, and to determine a plurality of measurement positions for each subarea of the plurality of subareas by excluding, from the plurality of candidate measurement positions, one of two candidate measurement positions at which the three-dimensional sensor has fields of view overlapping each other by at least a predetermined degree and/or a candidate measurement position corresponding to a posture of the robot undeterminable by inverse kinematics;

an operation controller configured to control the robot to move and cause the three-dimensional sensor to move to each of the plurality of measurement positions to measure each subarea of the plurality of subareas from a plurality of viewpoints; and an area definer configured to generate map information of the scan area based on a result of measurement performed by the three-dimensional sensor for each subarea of the plurality of subareas.

2. The control apparatus according to claim 1, wherein each subarea of the plurality of subareas in the scan area is in a shape of a rectangular prism, a sphere, a cylinder, or a polygon.

3. The control apparatus according to claim 1, wherein the plurality of subareas in the scan area result from slicing the scan area along a predetermined axis into a plurality of planes and dividing a plane of the plurality of planes into a grid.

4. The control apparatus according to claim 1, wherein the position determiner determines the plurality of measurement positions of the three-dimensional sensor to cause a predetermined position in each subarea of the plurality of subareas in the scan area to be within a field of view of the three-dimensional sensor at a corresponding measurement position of the plurality of measurement positions.

5. The control apparatus according to claim 4, wherein the position determiner determines the plurality of measurement positions of the three-dimensional sensor on a sphere or a circumference having a predetermined radius and centered on the predetermined position in each subarea of the plurality of subareas in the scan area.

6. The control apparatus according to claim 1, wherein the scan area is in a shape of a rectangular prism, and the position determiner determines, as each of the plurality of measurement positions of the three-dimensional sensor, a position at which an optical axis of the three-dimensional sensor is orthogonal to a plane of the scan area and the three-dimensional sensor is at a predetermined distance from a predetermined position in a corresponding subarea of the plurality of subareas in the scan area.

7. The control apparatus according to claim 4, wherein the predetermined position is a center of gravity.

8. The control apparatus according to claim 1, further comprising:

a path determiner configured to determine a path for the robot to move along to cause the three-dimensional sensor to move between the plurality of measurement positions.

9. The control apparatus according to claim 8, wherein the path determiner determines the path to cause the three-dimensional sensor to move to a measurement position in a shortest time or with least displacement from a first measurement position of the plurality of measurement positions, and the measurement position is other than a measurement position to which the three-dimensional sensor moves before moving to the first measurement position.

10. The control apparatus according to claim 1, further comprising:

a sensor controller configured to control an operation of the three-dimensional sensor.

11. The control apparatus according to claim 10, wherein the sensor controller controls the three-dimensional sensor to measure the scan area while the three-dimensional sensor is moving between the plurality of measurement positions.

12. The control apparatus according to claim 10, wherein the three-dimensional sensor includes an imager configured to capture a two-dimensional image to measure the scan area using the two-dimensional image, and the sensor controller changes, in response to the two-dimensional image captured by the three-dimensional sensor at a measurement position of the plurality of measurement positions including at least a predetermined number of pixels with a luminance value outside a predetermined range, at least one of a value of illuminance of an illuminator included in the three-dimensional sensor, a value of exposure time of the imager, or a value of gain of the imager from a value at which the two-dimensional image is captured, and the sensor controller controls the three-dimensional sensor to perform measurement at the measurement position.

13. The control apparatus according to claim 1, wherein the three-dimensional sensor includes an imager configured to capture a two-dimensional image to measure the scan area using the two-dimensional image, and the position determiner changes a measurement position of the plurality of measurement positions in response to the two-dimensional image captured by the three-dimensional sensor at the measurement position including at least a predetermined number of pixels with a luminance value outside a predetermined range.

14. A robot, comprising:

the control apparatus according to claim 1; and a three-dimensional sensor configured to measure a scan area.

15. A control method for a robot including a three-dimensional sensor to measure a scan area, the control method comprising:

dividing the scan area into a plurality of subareas, setting a plurality of candidate measurement positions for each subarea of the plurality of subareas based on positions of the plurality of subareas, and determining a plurality of measurement positions for each subarea of the plurality of subareas by excluding, from the plurality of candidate measurement positions, one of two candidate measurement positions at which the three-dimensional sensor has fields of view overlapping each other by at least a predetermined degree and/or a candidate measurement position corresponding to a posture of the robot undeterminable by inverse kinematics;

controlling the robot to move and cause the three-dimensional sensor to move to each of the plurality of measurement positions to measure each subarea of the plurality of subareas from a plurality of viewpoints; and generating map information of the scan area based on a result of measurement performed by the three-dimensional sensor for each subarea of the plurality of subareas.

16. A non-transitory computer readable medium storing a program for causing a computer to perform operations included in the control method according to claim 15.

* * * * *